May 13, 1941.  B. E. SHAW  2,241,747
SOLENOID VALVE
Filed May 22, 1939
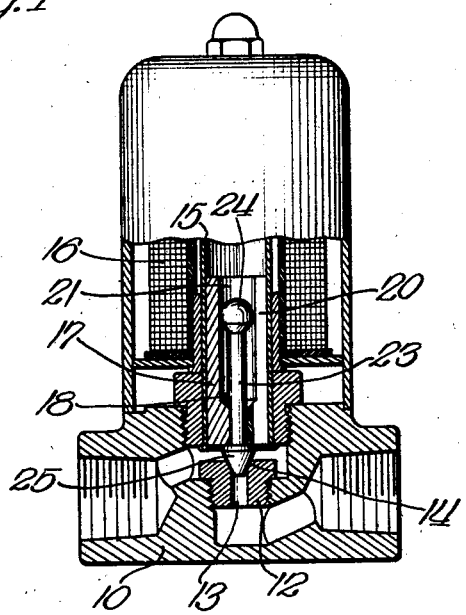
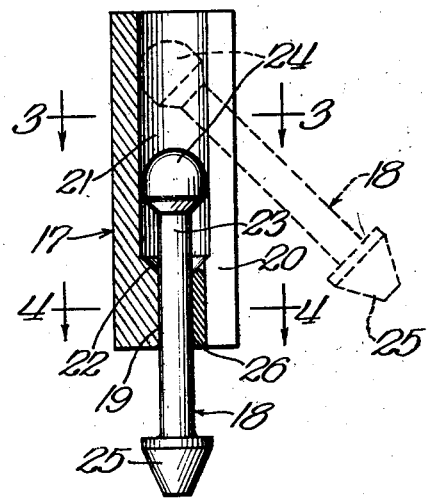
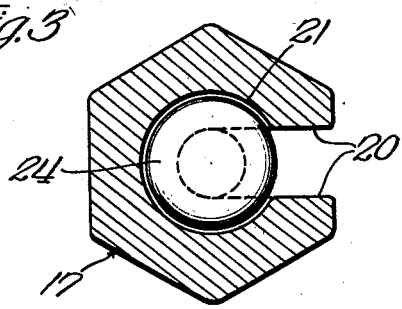
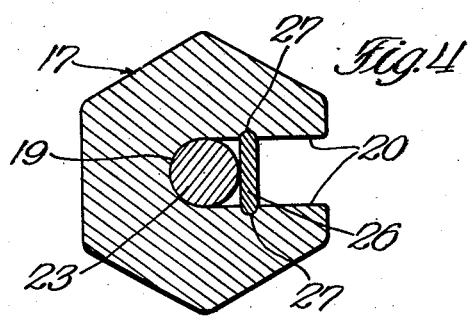
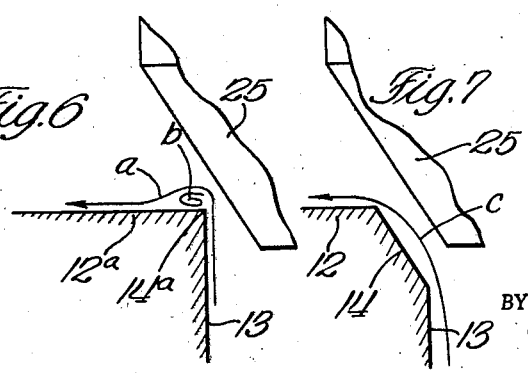
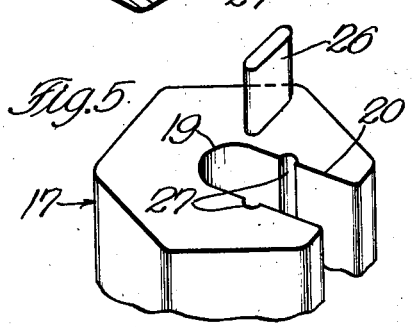
INVENTOR.
Burton E. Shaw
BY Bair & Freeman
ATTORNEYS Patented May 13, 1941

2,241,747

UNITED STATES PATENT OFFICE 2,241,747

SOLENOID VALVE

Burton E. Shaw, Bristol, Ind., assignor to Penn Electric Switch Co., Goshen, Ind., a corporation of Iowa Application May 22, 1939, Serial No. 275,063

4 Claims. (Cl. 137—139)

An object of my present invention is to provide a solenoid valve in which the plunger and seat construction thereof is novel with respect to the prior art, and is simple and inexpensive from a fabrication and assembly standpoint.

A further object is to provide a solenoid valve structure in which a valve seat element has a bore and a beveled shoulder adjacent the bore for the valve plug to seat against, the bevel of the shoulder permitting a relatively smooth flow of fluid through the valve and elimination of eddy currents through the valve as occasioned by the usual arrangement of having a square shoulder for the valve plug to seat against.

A further object is to provide a plunger and stem assembly in which the stem has a valve plug and a head, the head being adapted for engagement by the solenoid plunger as the plunger is raised by energization of the solenoid coil, the plunger and stem being so constructed that the stem together with its head is of one piece or integral construction as distinguished from usual two-part construction, thus eliminating crystallization and consequent breaking of the head from the stem where the usual expedient of screw-threading the head on the stem is provided.

Another object is to so form the plunger that an integral type of stem may be readily assembled relative thereto and subsequently locked in position as by a key or the like.

Still another object is to provide a plunger which has a slot inwardly from one side thereof to receive a shank of the plunger stem, the bottom of this slot for a portion of the length of the slot being enlarged to receive the head of the stem.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing forming a part of this specification and throughout the views of which like reference characters refer to the same parts.

Figure 1 is a vertical sectional view through a solenoid valve embodying my invention, the upper portion thereof being shown in side elevation.

Figure 2 is an enlarged vertical sectional view through the plunger and stem of the valve showing steps in the assembly of the plunger and the stem with relation to each other.

Figure 3 is an enlarged sectional view on the line 3—3 of Figure 2.

Figure 4 is an enlarged sectional view on the line 4—4 of Figure 2.

Figure 5 is a perspective view of the lower end of the plunger and the key for association therewith, and Figures 6 and 7 are comparative diagrammatic views of the usual type of valve seat and the improved type which forms part of my invention.

On the accompanying drawing I have used the reference numeral 10 to indicate a valve body. A valve seat element 12 is removably positioned therein as by screw threading and includes a bore 13 and a beveled shoulder 14.

A plunger tube 15 extends upwardly from the valve body 10 and is surrounded by a solenoid coil 16. Within the tube 15 a slidable plunger 17 and a stem 18 form an assembly responsive to energization of the coil 16 for permitting flow of fluid through the seat element 12.

The plunger 17 has a slot 19 extending inwardly from one side thereof, the sides of the slot being indicated at 20. Extending from the upper end of the plunger to a point spaced from the lower end thereof I provide an enlarged bore or enlargement of the bottom of the slot indicated at 21. The lower end of the enlarged bore 21 terminates in a shoulder 22.

The stem 18 comprises a one-piece member consisting of a shank 23, an enlarged head 24 and a valve plug 25. The shank 23 is of slightly less diameter than the width between the slot sides 20 so that during assembly the valve stem 18 may be associated with the plunger 17 by pressing the head 24 in the bore 21 and sliding the stem downwardly as to the dotted position of Figure 2 and finally to the full line position thereof.

To thereafter prevent misalignment of the stem 18 relative to the plunger 17, I provide a key 26 coacting with keyways 27 in the sides 20 of the slot 19. This key is press-fitted in the keyways and is preferably formed of or coated with insulating material to prevent eddy currents from generating in the plunger 17 when the coil 16 is energized.

Since the shank 23 and the head 24 are integrally formed of one piece, the usual trouble of breakage of the shank immediately under the head caused by crystallization due to the hammer action of the plunger on the stem and experienced with structures in which the head is a separate piece and then screw-threaded or otherwise secured to the shank, is eliminated in my construction. The plunger and stem are so formed however that they may be readily assembled and retained in assembled position by the key 26. The tapering of the valve seat at 14 also prevents the formation of undesirable eddy currents as illustrated in Figures 6 and 7.

In Figure 6 a valve seat member 14a of usual construction is shown having a square seating shoulder at 14b. The flow of current is indicated by the arrow a which forms an eddy current at b. On the other hand with my construction the fluid flow will take a path indicated by the arrow c in Figure 7 which smooths out or streamlines the flow to such an extent as to avoid undesirable eddy currents and thus retardation of fluid flow is reduced.

By actual comparative tests I have found that I am able to increase the flow by as much as 12½% or 13% using the same size of bore as at 13.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a plunger for use in a solenoid valve comprising a stem for said plunger having a valve plug, an integral head, and a shank between said plug and head, said plunger having a longitudinally arranged slot inwardly from one side and extending throughout the length thereof to receive said shank, said slot being of less diameter than said plug and said head and having an enlarged bore extending from the upper end of said plunger to a point spaced from the lower end thereof, said bore being of large enough diameter to receive said head, and a key inserted in the lower portion of said slot below said enlarged bore to retain said shank in said slot and thereby retain said stem against misalignment relative to said plunger.

2. In a plunger for use with a solenoid valve structure, a one-piece stem for said plunger having a valve plug at its lower end to seat on said valve seat, said stem having an integral enlarged head and an elongated shank between said plug and head, said plunger, throughout its length, having a slot inwardly from one side thereof of sufficient width to receive said shank, said plug and said head being permanently attached to said stem and of larger diameter than said slot and thereby incapable of passage through the slot, said slot having the bottom thereof enlarged longitudinally of said plunger from the upper end thereof to a point spaced from the lower end thereof, the portion of said plunger below the lower end of said enlarged portion of said slot being of substantially less height than the length of said shank and constituting a shoulder to engage said head and thereby lift said stem and valve plug when said plunger is moved upwardly in said plunger tube and a key inserted in said slot to retain said shank therein, the sides of said slot having depressions to receive said key.

3. A plunger for a solenoid valve comprising a one-piece stem for said plunger having a valve plug at one of its ends, an integral enlarged head at its other end and a shank between said plug and head, said plug and said head being permanently attached to said shank, said plunger having a slot inwardly from one side thereof of sufficient width to receive said shank, said slot extending throughout the height of said plunger and having the bottom thereof enlarged longitudinally of said plunger from the upper end thereof to a point spaced from the lower end thereof to provide a shoulder to engage said head and thereby lift said stem and valve plug when said plunger is moved upwardly in said plunger tube, said plug and said head being incapable of passing through the portion of said slot below said shoulder, and means inserted in said plunger to retain said shank in said portion of said slot.

4. A plunger and stem assembly for a solenoid valve comprising an elongated plunger having a slot throughout its length and inwardly from one side thereof, the bottom of said slot being enlarged at substantially the axis of said plunger whereby the portion of the plunger adjacent the end of the slot that is not enlarged constitutes a shoulder, said stem comprising an elongated shank of such diameter that it will pass through said slot during assembly, said stem having a valve plug on its lower end for coaction with said valve seat, and an integral head on its upper end, said head being enlarged with relation to said shank to engage the shoulder of said plunger during the upward movement of the plunger, said plug and said head being permanently attached to said shank and being incapable of passing through that portion of said slot which is not enlarged, said shank being substantially longer than said plunger below said shoulder, and means to retain said shank in said portion of said slot against dislocation therefrom after assembly of said stem relative to said plunger.

BURTON E. SHAW.